(12) United States Patent
Rusignuolo et al.

(10) Patent No.: US 10,704,820 B2
(45) Date of Patent: Jul. 7, 2020

(54) FLEXIBLE COOLING SYSTEM FOR VEHICLES

(71) Applicant: Carrier Corporation, Palm Beach Gardens, FL (US)

(72) Inventors: Giorgio Rusignuolo, Manlius, NY (US); Robert A. Chopko, Baldwinsville, NY (US); Greg Deldicque, Syracuse, NY (US); Yu H. Chen, Manlius, NY (US); Ciara Poolman, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 151 days.

(21) Appl. No.: 15/767,359

(22) PCT Filed: Oct. 11, 2016

(86) PCT No.: PCT/US2016/056363
§ 371 (c)(1),
(2) Date: Apr. 11, 2018

(87) PCT Pub. No.: WO2017/066157
PCT Pub. Date: Apr. 20, 2017

(65) Prior Publication Data
US 2018/0299178 A1    Oct. 18, 2018

Related U.S. Application Data

(60) Provisional application No. 62/242,683, filed on Oct. 16, 2015.

(51) Int. Cl.
*B60H 1/32* (2006.01)
*F25D 11/00* (2006.01)
(Continued)

(52) U.S. Cl.
CPC .......... *F25D 11/003* (2013.01); *B60H 1/3202* (2013.01); *B60H 1/3232* (2013.01);
(Continued)

(58) Field of Classification Search
CPC ........ F25D 11/003; F25D 17/00; F25D 17/08; B60H 1/3202; B60H 1/3232; B60P 3/20
See application file for complete search history.

(56) References Cited

U.S. PATENT DOCUMENTS 3,440,834 A    4/1969    Hirai et al.
3,557,569 A    1/1971    Hill et al.
(Continued)

FOREIGN PATENT DOCUMENTS

CN    1252364 A    5/2000
DE    3615570 A1    11/1986
(Continued)

OTHER PUBLICATIONS

Chinese Office Action, Chinese Application No. 201680060488.4, dated Apr. 2, 2019, 14 Pages.
(Continued)

*Primary Examiner* — Henry T Crenshaw
*Assistant Examiner* — Kamran Tavakoldavani
(74) *Attorney, Agent, or Firm* — Cantor Colburn LLP

(57) ABSTRACT

A cooling unit (506) for a vehicle (200) is provided. The cooling unit includes a compressor (428) electrically connected to a power module (314), a condenser (530) operably connected to the compressor, an evaporator (536) operably connected to the compressor and the condenser, the evaporator configured to cool ambient air (520), and at least one flexible duct (208) configured to fluidly connect the evaporator with a cargo held in a cargo space of the vehicle.

15 Claims, 6 Drawing Sheets

(51) Int. Cl.
*B60P 3/20* (2006.01)
*F25D 17/08* (2006.01)
*F25D 17/00* (2006.01)

(52) U.S. Cl.
CPC ............... *B60P 3/20* (2013.01); *F25D 17/00* (2013.01); *F25D 17/08* (2013.01)

(56) References Cited

U.S. PATENT DOCUMENTS

| | | | |
|---|---|---|---|
| 5,231,849 | A | 8/1993 | Rosenblatt |
| 5,819,550 | A | 10/1998 | Saia, III et al. |
| 6,615,908 | B1 | 9/2003 | Bosher et al. |
| 7,043,926 | B2 | 5/2006 | Smith |
| 8,756,947 | B2 | 6/2014 | Chen et al. |
| 2005/0204763 | A1 | 9/2005 | Smith |
| 2010/0058791 | A1* | 3/2010 | Quesada Saborio ......... B60H 1/3232 62/259.1 |
| 2010/0107661 | A1 | 5/2010 | Awwad et al. |
| 2012/0198866 | A1* | 8/2012 | Zeidner ............... F25D 11/003 62/89 |
| 2013/0086929 | A1 | 4/2013 | Senf, Jr. |
| 2013/0118195 | A1* | 5/2013 | Ikemiya ............... F25B 49/005 62/126 |
| 2013/0255913 | A1 | 10/2013 | Zwiefel |
| 2013/0340444 | A1 | 12/2013 | Bryant et al. |
| 2014/0335775 | A1 | 11/2014 | Clark |

FOREIGN PATENT DOCUMENTS

| | | |
|---|---|---|
| DE | 102007002940 A1 | 7/2008 |
| EP | 1621829 A1 | 2/2006 |
| JP | 2012250642 A | 12/2012 |
| KR | 20130057556 A | 6/2013 |
| WO | 2011050157 A2 | 10/2009 |
| WO | 2011055163 A1 | 5/2011 |
| WO | 2014205050 A1 | 12/2014 |

OTHER PUBLICATIONS

European Office Action, European Application No. 16784704.5, dated Apr. 25, 2019, 6 Pages.

International Search Report, International Application No. PCT/US2016/056363, dated Feb. 7, 2017, European Patent Office; International Search Report 5 pages.

Written Opinion of the International Searching Authority, International Application No. PCT/US2016/056363, dated Feb. 7, 2017, European Patent Office; Written Opinion 5 pages.

* cited by examiner

FLEXIBLE COOLING SYSTEM FOR VEHICLES

CROSS REFERENCE TO RELATED APPLICATIONS

This is a U.S. National Stage of Application No. PCT/US2016/056363, filed on Oct. 11, 2016, which claims the benefit of U.S. Provisional Patent Application No. 62/242,683, filed on Oct. 16, 2015, the disclosures of which are incorporated herein by reference.

BACKGROUND

The subject matter disclosed herein generally relates to cooling systems for vehicles and, more particularly, to flexible cooling systems for vehicles.

Cooling systems in vehicles may be configured with cooling systems, such as refrigeration units, that are set up for providing cooling within a cargo space. Such systems are rigidly connected and attached to the vehicle, such as to a cab or a wall of a cargo space. Further, rigid ducting and/or fabric chutes are used to direct cool air over cargo within the cargo space. In such embodiments, the refrigeration units tend to cool the entire cargo space generally, and do not focus the cooling to a specific area within the cargo space, e.g., they are not configured to cool only the cargo or the space immediately around the cargo.

SUMMARY

According to one embodiment, a cooling unit for a vehicle is provided. The cooling unit includes a compressor electrically connected to a power module, a condenser operably connected to the compressor, an evaporator operably connected to the compressor and the condenser, the evaporator configured to cool ambient air, and at least one flexible duct configured to fluidly connect the evaporator with a cargo held in a cargo space of the vehicle.

In addition to one or more of the features described above, or as an alternative, further embodiments of the cooling unit may include that the power module is an engine of the vehicle.

In addition to one or more of the features described above, or as an alternative, further embodiments of the cooling unit may include that the power module is an auxiliary power unit held on the vehicle.

In addition to one or more of the features described above, or as an alternative, further embodiments of the cooling unit may include that the cargo is a thermally isolated pallet.

In addition to one or more of the features described above, or as an alternative, further embodiments of the cooling unit may include a fan configured to blow air from the evaporator into the at least one flexible duct.

In addition to one or more of the features described above, or as an alternative, further embodiments of the cooling unit may include that the condenser is configured to receive and exhaust air through a tarp of the vehicle.

In addition to one or more of the features described above, or as an alternative, further embodiments of the cooling unit may include that the cooling unit is configured to be mounted on a wall of the vehicle.

In addition to one or more of the features described above, or as an alternative, further embodiments of the cooling unit may include that the compressor is configured to be located on an exterior of the vehicle and the evaporator is configured to be located in a cargo space of the vehicle.

According to another embodiment, a method of cooling cargo on a vehicle is provided. The method includes cooling air with a cooling unit installed on the vehicle and distributing the cooled air directly to a cargo within the vehicle through at least one flexible duct.

In addition to one or more of the features described above, or as an alternative, further embodiments of the method may include powering the cooling unit with a power module on the vehicle.

In addition to one or more of the features described above, or as an alternative, further embodiments of the method may include that the power module is an engine of the vehicle.

In addition to one or more of the features described above, or as an alternative, further embodiments of the method may include that the power module is an auxiliary power unit held on the vehicle.

In addition to one or more of the features described above, or as an alternative, further embodiments of the method may include that the cargo is a thermally isolated pallet.

In addition to one or more of the features described above, or as an alternative, further embodiments of the method may include receiving ambient air at a condenser of the cooling unit.

In addition to one or more of the features described above, or as an alternative, further embodiments of the method may include that the air is ambient air external to the vehicle.

Technical effects of embodiments of the present disclosure include a cooling unit for a vehicle that may be used to cool cargo in an open or tarp covered vehicle.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
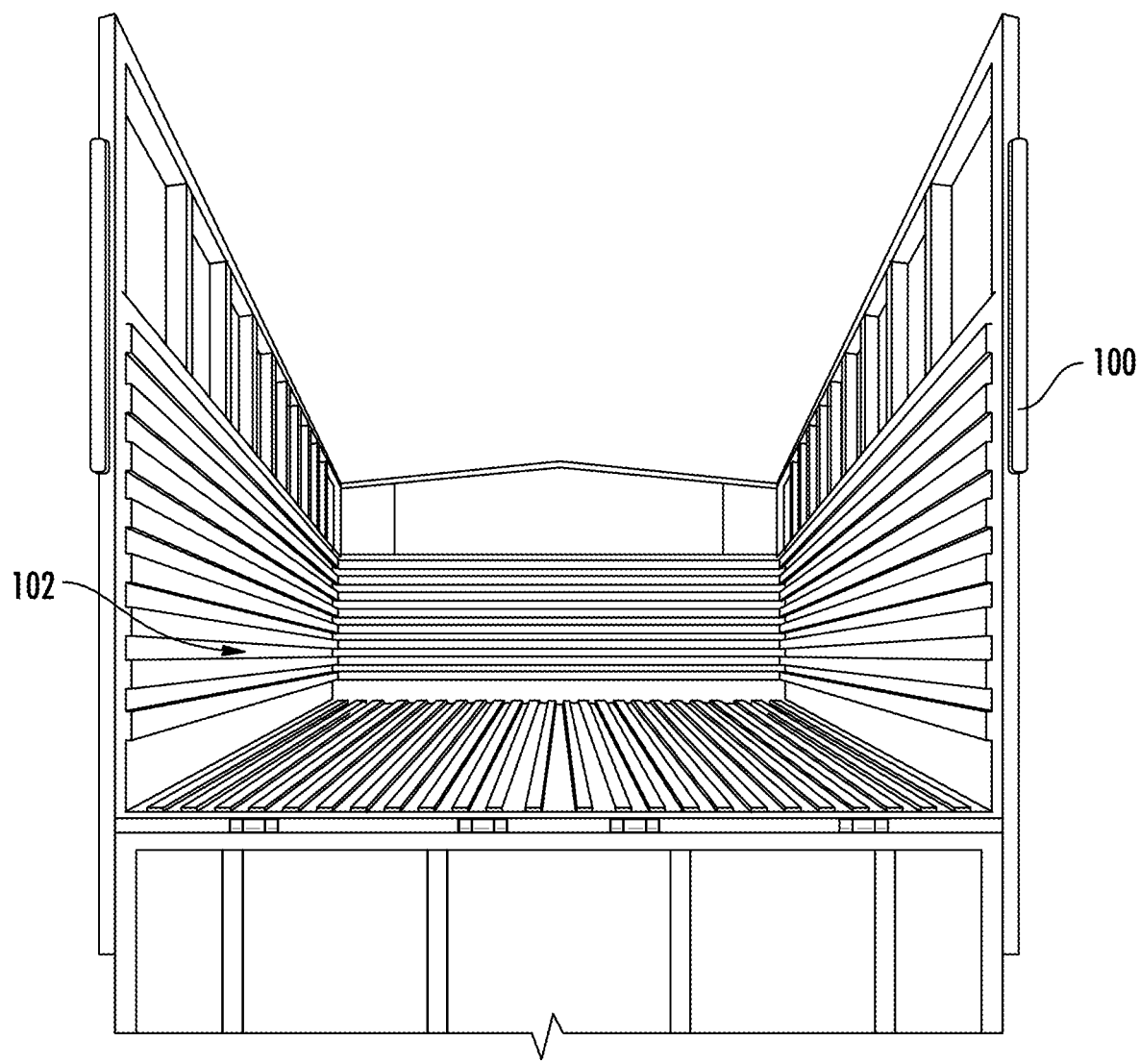
FIG. 1 is a schematic illustration of a vehicle without a tarp cover that may employ various embodiments disclosed herein.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a schematic illustration of a vehicle 100 having an open bed or cargo space 102, which may be configured to have a tarp attached thereto, i.e., a removable cover or canopy may be attached to the vehicle to cover the cargo space 102. The vehicle 100 cannot employ a fixed or rigid refrigeration unit because any cooling would be lost due to the open air of the cargo space 102. Even if a cover, such as a tarp, was configured over the cargo space 102, the leakage of any cooling would be sufficient to negate the cooling, or if a fixed or rigid refrigeration unit was employed, the unit may be overworked and fail quickly.

Figure 2:
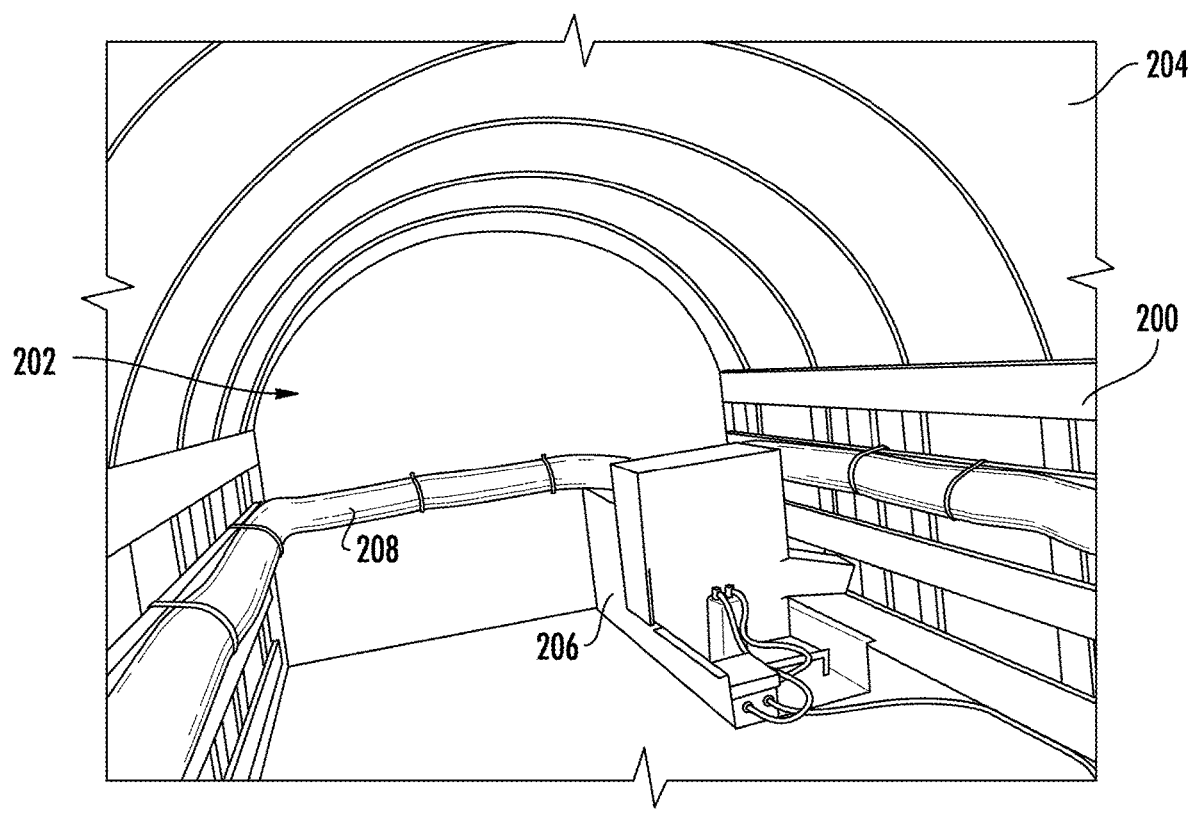
FIG. 2 is a schematic illustration of a vehicle cargo space with a tarp cover having a cooling unit in accordance with an embodiment of the present disclosure.

Turning now to FIG. 2, a vehicle 200 may have a cargo space 202, similar to that shown in FIG. 1. In this configuration, the cargo space 202 is covered or enclosed with a cover 204. Located within the cargo space 202 is a cooling system 206. The cooling system 206 may be a refrigeration unit having compressors, heat exchangers, fans, condensers, expansion devices, etc., as known in the art. The cooling system 206 may be configured in a mono-block configuration and connected via refrigerant hoses, not shown, to an open drive compressor powered by the engine of the vehicle 200. In other embodiments, the drive compressor may be powered by an auxiliary engine located on the vehicle 200. Attached to the cooling system 206 may be one or more flexible ducts 208. The flexible ducts 208 may be used to direct cool air to a product or other cargo (not shown) that is located within the cargo space 202. For example, in some embodiments, the flexible ducts 208 may be configured to deliver cool air directly to a cargo, such that only the cargo or a space around the cargo is cool. That is, in some embodiments, the flexible ducts 208 may be used to cool only a specific cargo or a portion of the cargo space 202, rather than cooling the entire cargo space 202.

As shown, rather than being physically connected to the vehicle 200, the cooling system 206 may be configured to sit on a bed of the cargo space 202. In alternative embodiments, described below, the cooling system 206 may be configured to hang or be removably attached to a wall of the cargo space 202 or be located elsewhere on the vehicle 200.

Figure 3:
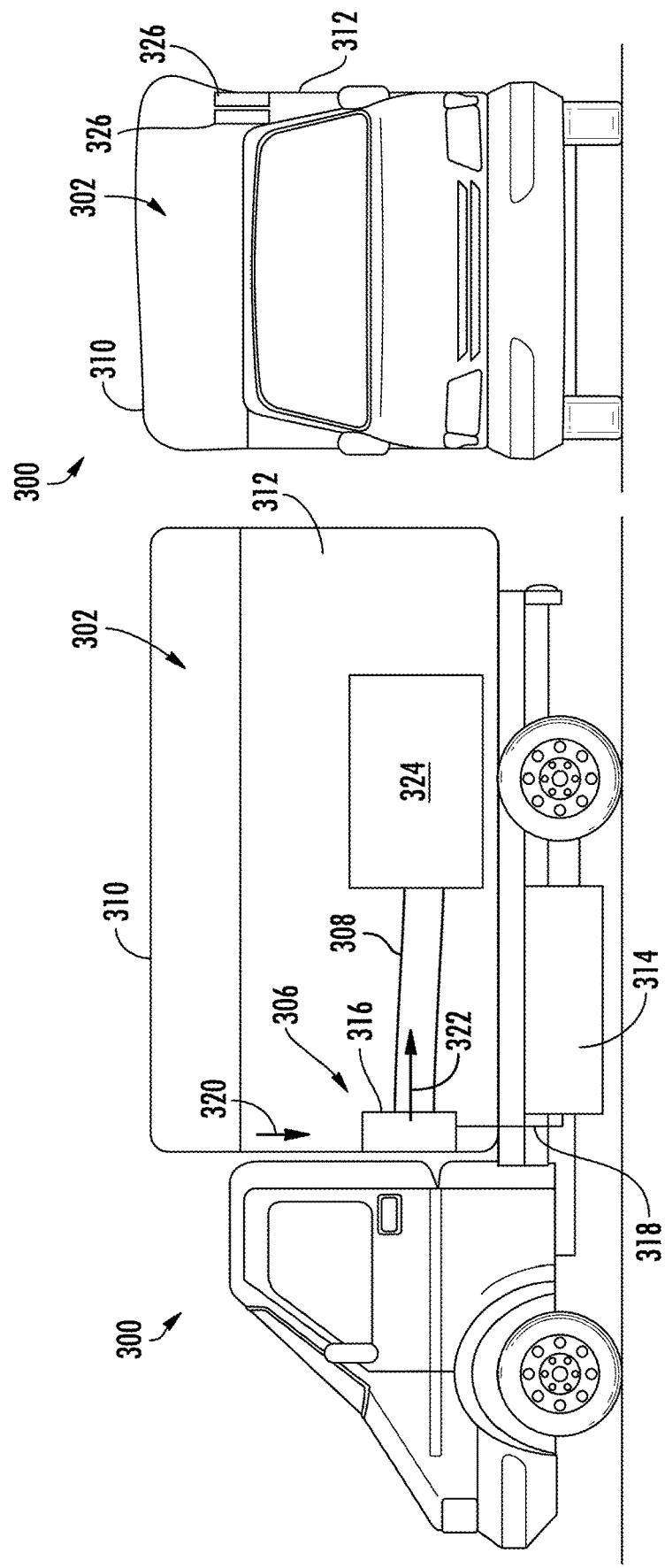
FIG. 3A is a side view schematic illustration of a vehicle having a cooling unit in accordance with an embodiment of the present disclosure.
FIG. 3B is a front view of the vehicle of FIG. 3A.

Turning now to FIGS. 3A and 3B, a side view and a front view of a vehicle 300 incorporating an embodiment of the present disclosure is shown, respectively. As shown in FIG. 3A, a vehicle 300 includes a cooling system 306. The cooling system 306 is located within the cargo space 302 of the vehicle 300. Further, as shown, the vehicle 300 includes a tarp 310 that is configured to enclose the cargo space 302. The tarp 310 may be configured to attach to a wall 312 of the vehicle 300.

The cooling system 306 is connected to a power module unit 314. The power module unit 314 may be configured with a compressor, a condenser, an alternator, and/or an engine. In some embodiments, a 12 or 24 V alternator or 120V generator may be configured to power an evaporator fan. As shown, the generator/alternator can be located under the truck carriage in the air conditioning unit 314, or in some embodiments the alternator in the engine compartment may be employed. As shown, the power module unit 314 of the cooling system 306 is located outside of the vehicle 300, i.e., separate from the other components of the cooling system 306. The power module unit 314 is connected to an evaporator 316 by connecting lines 318. The connecting lines 318 may include electric lines and refrigerant piping. The electric lines of the connecting lines 318 may be used to power the evaporator 316 and the refrigerant piping of the connecting lines may be used to fluidly connect the condenser and compressor with the evaporator 316.

The evaporator 316 of the cooling unit 306 may be configured to intake warm air 320 and output cooled air 322 into the flexible duct 308. The warm air in this embodiment may be pulled from within the cargo space 302. The cooled air 322 may be supplied directly to cargo 324 located within the cargo space 302. That is, the cooled air 322 may be supplied through the flexible duct 308 directly to a product or other location or area that requires cooling, without attempting to cool the entire cargo space 302. If the cargo 324 is encased in its own enclosure, a flexible duct can be used to provide intake warm air 320 from the cargo enclosure.

As shown in FIG. 3B, the tarp 310 may include one or more slits 326. The slits 326 may be used to connect the cooling unit 306, or components thereof, to the ambient air with an air hose (not shown). For example, an air hose may connect a condenser of the cooling unit 306 to the ambient air.

Figure 4:
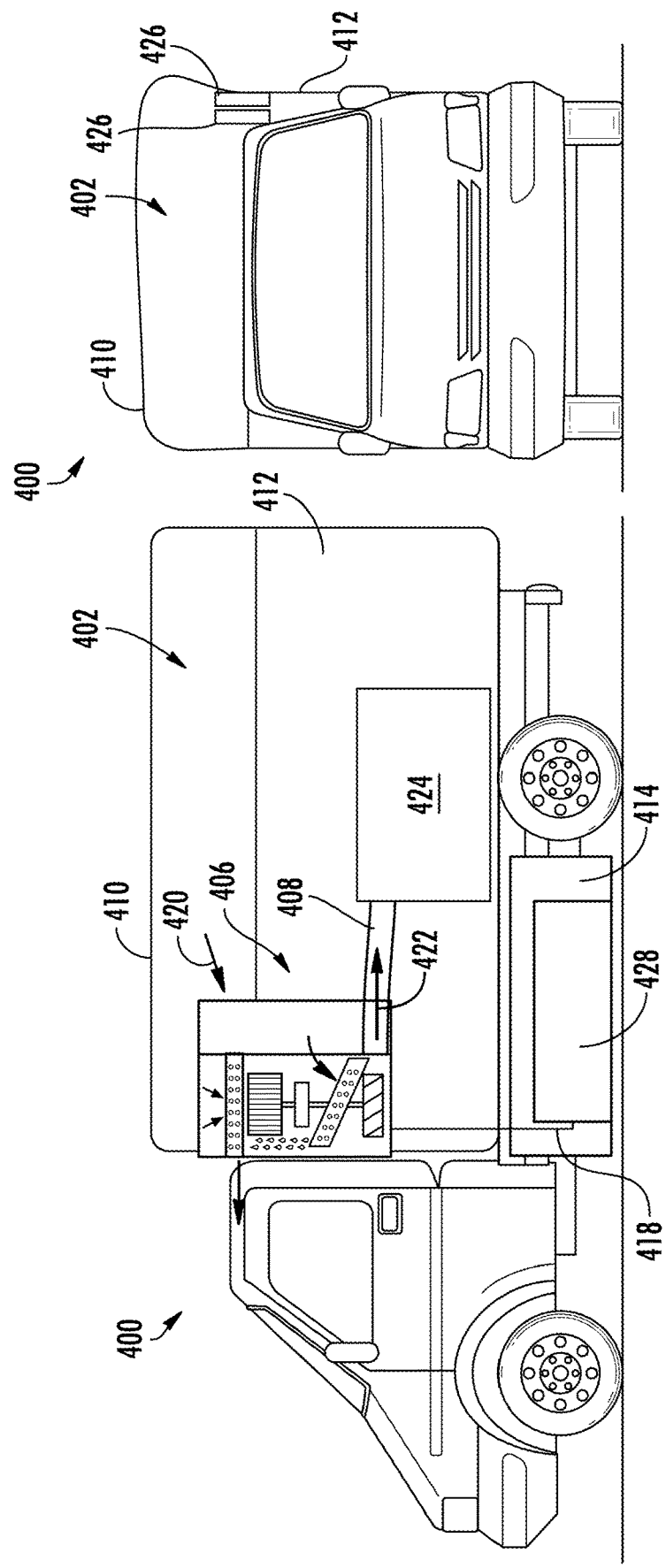
FIG. 4A is a side view schematic illustration of a vehicle having a cooling unit in accordance with an embodiment of the present disclosure.
FIG. 4B is a front view of the vehicle of FIG. 4A.

Turning now to FIGS. 4A and 4B, an alternative embodiment of a vehicle 400 having a cooling unit 406 in accordance with the present disclosure is shown. As shown, the vehicle 400 includes a wall 412 and a tarp 410 that define a cargo space 402. In the cargo space 402 is a cooling unit 406 that is configured to supply cooled air 422 to a cargo 424 through flexible duct 408. The tarp 410 may include one or more slits 426 may be used to connect the cooling unit 406, or components thereof, to the ambient air with an air hose (not shown). For example, an air hose may connect a condenser of the cooling unit 406 to the ambient air.

The primary difference between the cooling unit 406 of FIG. 4A and the cooling unit 306 of FIG. 3A is that the cooling unit 406 is primarily contained within the cargo space 402. That is, the only components that are external to the cargo space 402 may be a compressor 428 in a power module unit 414. The power module unit 414 may include an alternator and/or an engine, or may be powered by the alternator/engine of the vehicle 400. In some embodiments, the power module 414 may be a power-pack that is an auxiliary power unit that may provide sufficient power to operate the cooling unit 406 without requiring any loads to be applied to an engine or power source of the vehicle.

In operation, warm air 420 may be pulled into the cooling unit 406 which includes an evaporator. The air is cooled in the evaporator of the cooling unit 406 and the cooled air 422 is supplied to the cargo 424 through the flexible duct 408. In some embodiments, the cargo 424 may be configured as a thermally covered pallet or thermally insulated pallet.

In some embodiments, an auxiliary engine and the compressor of the cooling unit may be located in a power module box mounted underneath or on the side of the vehicle. The fan or fans of the compressor may be powered from an alternator of the vehicle.

In some embodiments, the cooling unit may include quick connections to flexible refrigerant hoses, making it possible to install the cooling unit in multiple locations. That is, the cooling units described herein may be moveable such that they can be configured with any vehicle configuration, and are thus not dependent on the configuration of the vehicle. For example, in some embodiments, rather than locating the cooling unit within the cargo space of the vehicle, the cooling unit may be connected or installed on a roof of a cab of the vehicle, and the flexible duct of the cooling unit can deliver the cool air to a specific cargo that is in the cargo space of the vehicle. In some embodiments, may employ the use of a hermetic or semi-hermetic compressor. Such hermetic compressor may be located in the power module box and powered by a generator set.

Further, in some embodiments, multiple cooling units may be employed with the cargo space of the vehicle. Each cooling unit may have flexible ducts to direct cool air. In some embodiments, the configuration of the cooling unit may be conceived in a clamshell design, using keyholes mountings that may reduce costs of the cooling units. Moreover, in some embodiments, condensate water may be disposed by dripping condensate water directly to the condenser to enhance a cooling capacity of the cooling unit.

In some embodiments, the cargo may be configured within a thermal covering or insulator. In such embodiments, the flexible ducts of the cooling unit may be configured to deliver cool air into a space contained by the thermal covering and use flexible ducts to return the intake warm air of the cargo back to the evaporator, thus supplying maximum cooling to a specific area, even if the vehicle has an open bed for transportation of the cargo.

Figure 5:
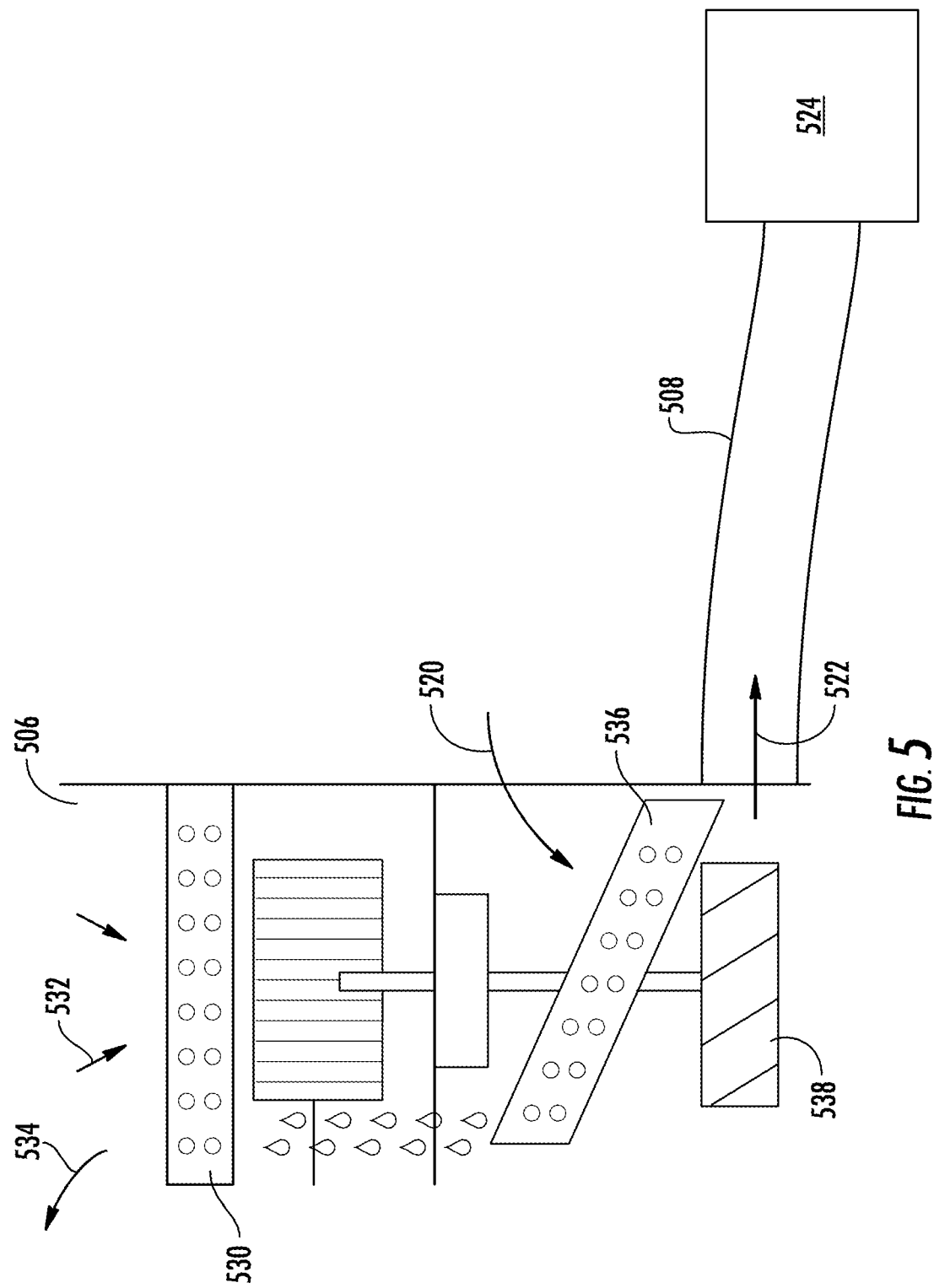
FIG. 5 is an enlarged schematic view of a cooling unit in accordance with an embodiment of the present disclosure.

Turning now to FIG. 5, an enlarged view of a cooling unit 506 is shown. Cooling unit 506 is configured to supply cooled air 522 to a cargo 524. The cooling unit 506 includes a condenser 530 that may be configured to receive ambient air 532 and exhaust air 534. The ambient air 532 and the exhaust air 534 may be conveyed through slits in a tarp of a vehicle upon which the cooling unit 506 is installed, as described above.

The cooling unit 506 also includes an evaporator 536 configured to cool warm air 520 that is taken in from the air of the cargo space of a vehicle. The cooled air 522 is then blown into the flexible duct 508 by a fan 538. The flexible duct 508 is connected to the cooling unit 506 such that the evaporator 536 can supply the cooled air 522 directly into the flexible duct to provide 'spot cooling' directly to the cargo.

Figure 6:
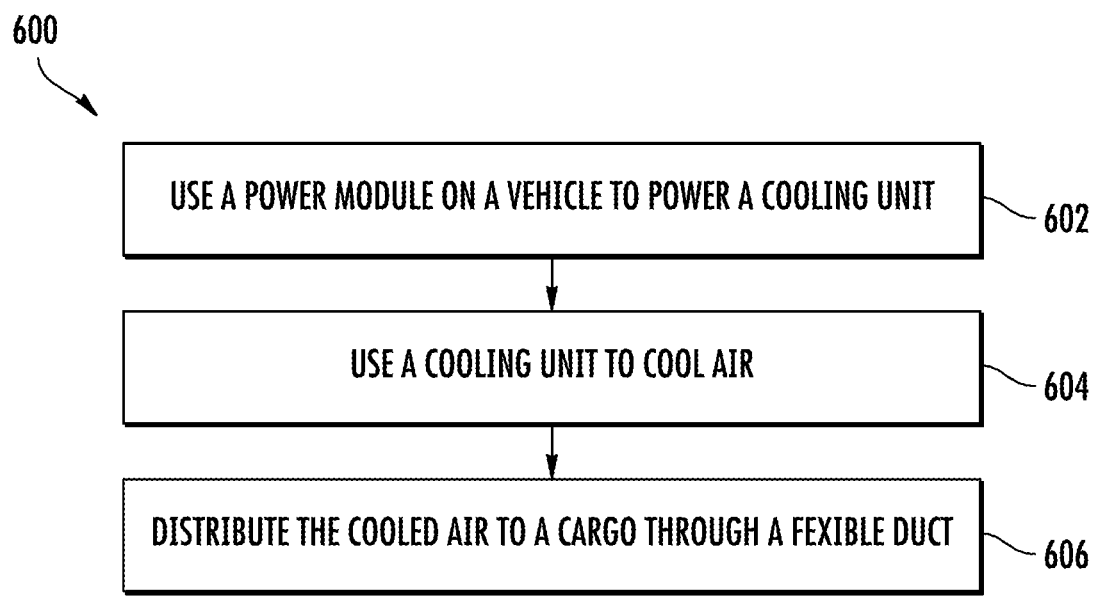
FIG. 6 is a flow process for cooling a cargo in accordance with an embodiment of the present disclosure.

Turning to FIG. 6, a flow process of cooling a specific area in a vehicle, such as an open or tarp covered vehicle, is shown. Flow process 600 may be carried out by cooling units as described above. First, a cooling unit is powered by a power module on the vehicle, as shown at block 602. The power module may be an engine of the vehicle or an auxiliary power unit or power pack. Next, an evaporator of the cooling unit is configured to cool ambient air or air within a cargo space, as shown at block 604. The cooled air is then supplied through one or more flexible ducts to a cargo in the cargo space of the vehicle, as shown at block 606. The flexible duct enables cooling of a discrete or specific cargo within a cargo space, and thus eliminates the need for cooling an entire cargo space.

Advantageously, embodiments described herein provide a cooling unit for cargo that may employed in a vehicle having a generally open cargo space, such as vehicles having cargo spaces that are covered by tarps. For example, advantageously, fresh food may be transported in any type of vehicle without requiring a specialized vehicle. Advantageously, a relatively inexpensive cooling system is provided that is able to reduce temperature and humidity of a cargo space or specific cargo, without necessarily bringing temperatures down to the ideal refrigeration temperature for the cargo. In this way an inexpensive solution can be used, capable of extending cargo life compared to a situation where no cooling is used at all. Furthermore, advantageously, cooling units as described herein can be easy and very flexible with regards to installation, adapting to open trucks and multiple configurations.

Advantageously, embodiments disclosed herein offer a low cost alternative to the "normal" food transportation in developing countries (no refrigeration). Also, embodiments disclosed herein offer a flexible installation solution, adaptable to multiple vehicle configurations. Further, embodiments disclosed herein enable the possibility of a power-pack module, offering the possibility to cool a cargo even in cases when the vehicle engine does not have sufficient residual power.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although described herein with respect to trucks, those of skill in the art will appreciate that cooling units as described herein may be employed in other vehicles, such as boats and/or aircraft. Moreover, the cooling units described herein may be able to be completely removed from a vehicle, such that cooling may be provided to a cargo that is removed from the vehicle. For example, as described above, an auxiliary power unit, such as a power pack, may be used to power the cooling unit, and thus a power source from a vehicle may not be required.

Accordingly, the present disclosure is not to be seen as limited by the foregoing description, but is only limited by the scope of the appended claims.

What is claimed is:

1. A cooling unit for a vehicle, the cooling unit comprising:
   a tarp configured to enclose and at least partially define a cargo space of the vehicle, the tarp comprising at least one slit;
   a compressor electrically connected to a power module;
   a condenser operably connected to the compressor;
   an evaporator operably connected to the compressor and the condenser, the evaporator configured to cool ambient air;
   at least one flexible duct configured to fluidly connect the evaporator with a cargo held in the cargo space of the vehicle, wherein cooling air is delivered directly to the cargo though the at least one flexible duct;
   at least one air hose fluidly connecting the compressor to ambient air outside of the tarp through the at least one slit.

2. The cooling unit of claim 1, wherein the power module is an engine of the vehicle.

3. The cooling unit of claim 1, wherein the power module is an auxiliary power unit held on the vehicle.

4. The cooling unit of claim 1, wherein the cargo is a thermally isolated pallet.

5. The cooling unit of claim 1, further comprising a fan configured to blow air from the evaporator into the at least one flexible duct.

6. The cooling unit of claim 1, wherein the condenser is configured to receive and exhaust air through the tarp of the vehicle.

7. The cooling unit of claim 1, wherein the cooling unit is configured to be mounted on a wall of the vehicle.

8. The cooling unit of claim 1, wherein the compressor is configured to be located on an exterior of the vehicle and the evaporator is configured to be located in the cargo space of the vehicle.

9. A method of cooling cargo on a vehicle, the method comprising:
   cooling air with a cooling unit installed on the vehicle;
   distributing the cooled air directly to a cargo within the vehicle through at least one flexible duct, and
   exhausting air from the cooling unit through an air hose that connects the cooling unit through a slit in a tarp of the vehicle to ambient, wherein the tarp encloses and at least partially defines a cargo space of the vehicle.

10. The method of claim 9, further comprising powering the cooling unit with a power module on the vehicle.

11. The method of claim 10, wherein the power module is an engine of the vehicle.

12. The method of claim 10, wherein the power module is an auxiliary power unit held on the vehicle.

13. The method of claim 9, wherein the cargo is a thermally isolated pallet.

14. The method of claim 9, further comprising receiving ambient air at a condenser of the cooling unit.

15. The method of claim 9, wherein the air is ambient air external to the vehicle.

* * * * *